(12) United States Patent
Mizuno et al.

(10) Patent No.: US 7,286,172 B2
(45) Date of Patent: Oct. 23, 2007

(54) OPTICAL SENSOR

(75) Inventors: Seiichiro Mizuno, Hamamatsu (JP);
Hiroo Yamamoto, Hamamatsu (JP);
Kazuki Fujita, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 936 days.

(21) Appl. No.: 10/343,427

(22) PCT Filed: Aug. 3, 2001

(86) PCT No.: PCT/JP01/06699

§ 371 (c)(1),
(2), (4) Date: Jan. 31, 2003

(87) PCT Pub. No.: WO02/12845

PCT Pub. Date: Feb. 14, 2002

(65) Prior Publication Data

US 2003/0156211 A1 Aug. 21, 2003

(30) Foreign Application Priority Data

Aug. 3, 2000 (JP) .............................. 2000-235911

(51) Int. Cl.
*H04N 3/14* (2006.01)
(52) U.S. Cl. ...................................... 348/294; 348/308
(58) Field of Classification Search ................ 348/300, 348/301, 307
See application file for complete search history.

(56) References Cited

U.S. PATENT DOCUMENTS 5,892,540 A * 4/1999 Kozlowski et al. ......... 348/300

(Continued)

FOREIGN PATENT DOCUMENTS

JP 63-205527 8/1988

(Continued)

OTHER PUBLICATIONS

Steven L. Garverick, et al., "A 32-Channel Charge Readout IC Programmable, Nonlinear Quantization of Multichannel Detector Data", IEEE Journal of Solid-State Circuits, vol. 30, No. 5, pp. 533-541, May 1995.

*Primary Examiner*—David Ometz
*Assistant Examiner*—Luong T. Nguyen
(74) *Attorney, Agent, or Firm*—Drinker Biddle & Reath LLP

(57) ABSTRACT

An amount of charges consonant with the intensity of the light entering photodiodes is generated, and the level of the charges is determined by a charge level determination circuit. Based on this determined charge level, a capacitance setting circuit sets a capacitance of an integrating capacitor unit in an integrating circuit. Thereafter, in the integrating circuit, the charges generated by the photodiodes are integrated in the integrating capacitor unit, and a voltage having a value consonant with the amount of the integrated charges is output. When background light is strong and the overall intensity of incident light is high, a comparatively large capacitance is set for the variable capacitor unit of the integrating circuit, and the intensity of the incident light is detected without saturation. When background light is weak and the overall intensity of incident light is low, a comparatively small capacitance is set for the variable capacitor unit of the integrating circuit, and the intensity of the incident light is detected at high sensitivity, regardless of the surrounding conditions.

4 Claims, 10 Drawing Sheets

U.S. PATENT DOCUMENTS 6,128,039 A * 10/2000 Chen et al. .................. 348/294
6,593,562 B1 * 7/2003 Parrish et al. ............ 250/208.1
6,700,110 B2 * 3/2004 Mizuno et al. .......... 250/208.1
6,956,607 B2 * 10/2005 Mizuno et al. ............. 348/308

FOREIGN PATENT DOCUMENTS

| | | |
|---|---|---|
| JP | 2-288709 | 11/1990 |
| JP | 03-10126 | 1/1991 |
| JP | 5-291955 | 11/1993 |
| JP | 9-51476 | 2/1997 |
| JP | 10-153425 | 6/1998 |
| JP | 2000-32342 | 1/2000 |

* cited by examiner

Fig.3A  Fig.3B  Fig.3C
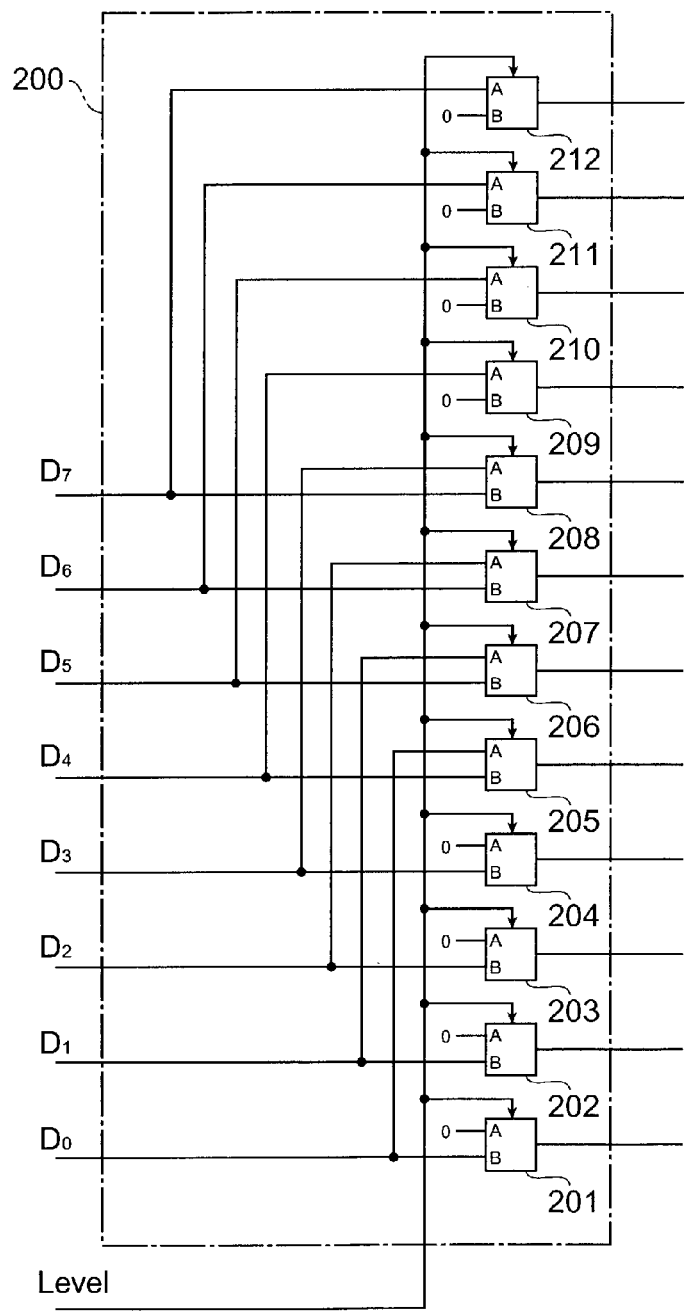

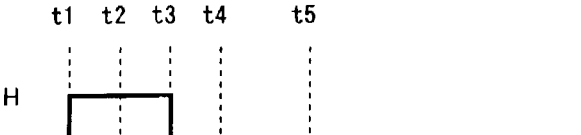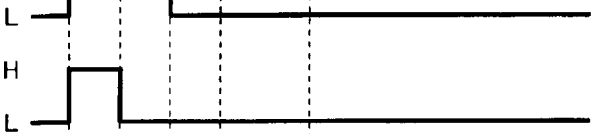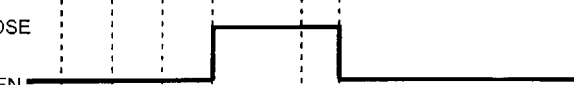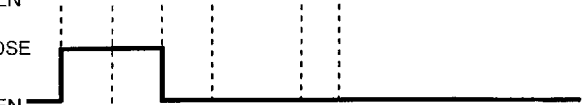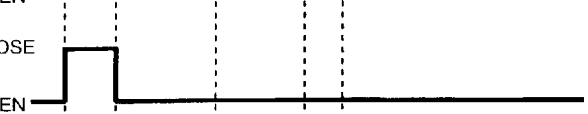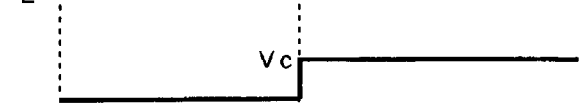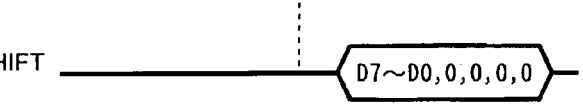

SW110 OF A/D CONVERTER CIRCUIT 40

SW120 OF A/D CONVERTER CIRCUIT 40

OPTICAL SENSOR

TECHNICAL FIELD

The present invention relates to a light detection apparatus for outputting a digital signal having a value consonant with the intensity of incident light.

BACKGROUND ART

A light detection apparatus includes one or more light detection devices and an integrating circuit for outputting a voltage having a value consonant with the amount of electrical charges output by the light detection devices. In this light detection apparatus, electrical charges output by the light detection devices, in amounts equivalent to the intensity of the incident light, are integrated in the integrating circuit and are output by the integrating circuit as a voltage having a value consonant with the amount of the integrated charges, and based on this voltage, the intensity of the incident light is obtained.

The light detection apparatus may further include an A/D converter circuit for converting into a digital signal a voltage (analog signal) output by the integrating circuit. In this case, the intensity of the incident light can be obtained as a digital value, and can be processed by a computer and the like. When multiple light detection devices are arranged, either one-dimensionally or two-dimensionally, the light detection apparatus can be employed as a solid-state image pickup apparatus.

The CMOS technique can be used to manufacture such a light detection apparatus, and when in the integrating circuit the capacitance of a capacitor for converting a current into a voltage is changed, the dynamic range for the detection of the intensity of the incident light can be increased.

Such a light detection apparatus is disclosed, for example, in reference document "A 32-Channel Charge Readout IC for Programmable, Nonlinear Quantization of Multichannel Detector Data," S. L. Garverick, et al., IEEE Journal of Solid-State Circuits, Vol. 30, No. 5, pp. 533-541 (1995).

In the same referenced document, the light detection apparatus having an integrating circuit in which an integrating capacitor unit having a variable capacitance is provided between the input/output terminals of an amplifier is shown. The integrating circuit integrates the charges output by a light detection device in the integrating capacitor unit, and outputs a voltage having a value consonant with the amount of the integrated charges.

For the light detection apparatus in this reference, the capacitance of the integrating capacitor unit is controlled from outside the apparatus to increase the dynamic range for the detection of the intensity of the incident light.

That is, when the capacitance of the integrating capacitor unit is reduced, the detection sensitivity is increased, even when the intensity of the incident light is low. Meanwhile, when the capacitance of the integrating capacitor unit is increased, saturation of an output signal can be avoided, even when the intensity of the incident light is high.

With the light detection apparatus (solid-state image pickup apparatus) described in the above referenced document, even during the daytime in the middle of summer, for example, when conditions are such that the surroundings are brightly lighted, an object can be imaged without saturation of an output signal occurring. Further, when conditions are such that the surroundings are very dark, such as at night, it is possible to image an object with high sensitivity.

DISCLOSURE OF THE INVENTION

However, the light detection apparatus described in the referenced document determines the magnitude of the value of the output signal and whether the output signal is saturated, and based on the determination results, externally controls the capacitance of the integrating capacitor unit provided for the integrating circuit. Thus, the light detection apparatus can not rapidly detect the intensity of incident light.

Furthermore, when the brightness differs greatly, depending on the positioning of an object, and when the light detection apparatus (a solid-state image pickup apparatus) described in the above reference is employed to image, at high sensitivity, a darker portion of an object, saturation of an output signal for the brighter portion of the object will occur. Whereas, when the brighter portion of an object is to be imaged to avoid the occurrence of saturation, the imaging sensitivity for the darker portion of the object is reduced.

As is described above, for the light detection apparatus (solid-state image pickup apparatus) in the above reference, the capacitance of the integrating capacitor unit is appropriately set for each imaging in order to extend the dynamic range for the detection of the intensity of the incident light; however, on a screen, the dynamic range for detecting the intensity of the incident light for each pixel can not be increased.

To resolve these problems, it is an objective of the present invention to provide a light detection apparatus that can rapidly detect the intensity of incident light.

According to the present invention, a light detection apparatus comprises: a determination circuit for receiving an analog signal consonant with the output of a light detection device and for determining the magnitude of the analog signal; and A/D conversion means for converting the analog signal into a digital signal in accordance with a resolution consonant with the output of the determination circuit.

The resolution of the conversion has a property that is the opposite of the dynamic range. When the light intensity incident to the light detection device is high, the determination thereof is made by the determination circuit, which receives an analog signal consonant with the output of the light detection device, and A/D conversion is performed in accordance with the resolution consonant with the output of the determination circuit. As a result, even when the resolution is reduced, the dynamic range on the high intensity side is ensured.

When the intensity of incident light is small, the detection thereof is made by the determination circuit, and A/D conversion is performed in accordance with the resolution consonant with the output of the determination circuit. As a result, the resolution can be increased while the dynamic range on the high intensity side is narrowed. Of course, since in this case the intensity of the incident light is low, essentially, the A/D conversion may not be performed on the high intensity side.

Especially, since an analog signal in consonance with the output of the light detection device is entered, the A/D conversion means for receiving this analog signal can be controlled by the determination circuit that has received the analog signal. Since the resolution of the A/D conversion means is not controlled based on the luminance of a digitized video signal unlike in the conventional case, high-speed control is possible.

There are several possible configurations for this A/D conversion means.

According to one of these configurations, the A/D conversion means includes: an integrating circuit, in which a group of capacitors connected to the rear stage of the light detection device is connected in parallel between the input/output terminals of the operational amplifier; and a capacitance setting circuit for, before integrating of charges in the capacitor group is started, setting, in accordance with the output of the determination circuit, a combined capacitance of the group of capacitors between the input/output terminals.

Generally, a relationship is established wherein a voltage=the amount of charges/a capacitance. Therefore, when there is an increase in the combined capacitance as the intensity of the incident light is increased, the change in the voltage output by the integrating circuit, relative to the change in the amount of charges, is reduced, as is the conversion resolution; however, even when the intensity of the incident light is high, the intensity of the incident light can be detected without the output voltage becoming saturated. Whereas, when the combined capacitance is reduced as the intensity of the incident light is lowered, the change in the output voltage of the integrating circuit, relative to the change in the amount of charges, is increased, as is the conversion resolution.

As another configuration, the A/D conversion means comprises: (A) an integrating circuit connected to the rear stage of a light detection device; and (B) an A/D converter circuit, including a main capacitor for integrating charges proportional to the output of the integrating circuit, multiple sub-capacitors for integrating the charges that are transferred from the main capacitor in which the charges have been integrated, and a capacitance controller for controlling the transfer of charges to the multiple sub-capacitors, and for outputting the control value as the digital signal, wherein the amount of charges that can be integrated in each of the sub-capacitors is set in accordance with the output of the determination circuit. In this case, the A/D converter circuit adjusts the resolution based on the output of the determination circuit.

In this case, when a voltage applied at both ends of each of the sub-capacitors is decided depending on the output of the determination circuit, the amount of charges that can be integrated in each of the sub-capacitors is set.

As still another configuration, the A/D conversion means comprises: (1) an integrating circuit connected to the rear stage of the light detection device; and (2) an A/D converter circuit including, a main capacitor for integrating charges proportional to the output of the integrating circuit, multiple sub-capacitors for integrating the charges that are transferred from the main capacitor in which the charges have been integrated, and a capacitance controller for controlling the transfer of the charges to the multiple sub-capacitors, and for outputting as the digital signal a value for controlling, wherein a group of sub-capacitors having a specific group of capacitances is selected from among the sub-capacitors in accordance with the output of the determination circuit, and wherein charges are transferred from the main capacitor to the selected group of sub-capacitors under the control of the capacitance controller.

Furthermore, there is a conceivable configuration in which the change amount of an analog signal from the light detection device is increased, regardless of the performance of A/D conversion. In this case, a light detection apparatus comprises: (1) a light detection device for generating and outputting an amount of charges corresponding to the intensity of incident light; (2) an integrating circuit, including an integrating capacitor unit having a variable capacitance, for integrating charges generated by the light detection device in the integrating capacitor unit, and for outputting a voltage corresponding to the amount of the integrated charges; (3) a charge level determination circuit for determining the level of the charges generated by the light detection device; and (4) a capacitance setting circuit for setting a capacitance for the integrating capacitor unit based on the charge level determined by the charge level determination circuit, before a charge accumulation operation by the integrating circuit is started.

According to this light detection apparatus, an amount of charges consonant with the intensity of the light entering the light detection device is generated, and the level of the charges is determined by the charge level determination circuit. Based on the determined charge level, the capacitance setting circuit sets the capacitance of the integrating capacitor unit in the integrating circuit.

Thereafter, in the integrating circuit, the charges generated by the light detection device are integrated in the integrating capacitor unit, and a voltage consonant with the amount of the integrated charges is output. When the intensity of incident light is high, a comparatively large value is set for the capacitance of the variable capacitor unit in the integrating circuit. Since the output voltage=the amount of charges/the capacitance, the change in the voltage relative to the change in the amount of charges is reduced, and when the A/D conversion is performed for the output of the integrating circuit, the resolution is lowered, but the intensity of incident light, even when it is high, can be detected without saturation.

On the other hand, when the intensity of incident light is low, a comparatively small value is set for the capacitance of the variable capacitor unit in the integrating circuit, the change in the voltage relative to the change in the amount of charges is increased, and the intensity of incident light, even when it is low, can be detected at a high resolution, i.e., with high sensitivity.

According to the present invention, the light detection apparatus further comprises: an A/D converter circuit for performing the A/D conversion of a voltage output by the integrating circuit, and for outputting a digital signal. In this case, the voltage output by the integrating circuit is input to the A/D converter circuit, which converts the voltage into a digital signal and outputs this digital signal.

Further, according to the present invention, the light detection apparatus additionally comprises: a shift circuit for receiving a digital signal output from the A/D converter circuit, and for shifting bits of the digital signal, in accordance with the charge level determined by the charge level determination circuit to output the resultant signal. In this case, the digital signal output by the A/D converter circuit is output following the shifting of the bits by the shift circuit in accordance with the charge level determined by the charge level determination circuit.

Furthermore, according to the light detection apparatus of the present invention, (1) the capacitance of the integrating capacitor unit can be set to a first capacitance or a second capacitance, and the first capacitance is $2^n$ times (n is an integer equal to or greater than one) the second capacitance, and (2) the A/D converter circuit outputs a digital signal having n or greater bits. In this case, the digital signal output by the A/D converter circuit is subject to n-bit left shift, as needed, and the value of the obtained digital signal represents a superior linearity relative to the intensity of incident light.

BRIEF DESCRIPTION OF THE DRAWINGS

FIG. 3A is a circuit diagram showing a shift circuit 200 in the light detection apparatus 1 according to the present embodiment;

FIGS. 3B and 3C are diagrams showing two patterns for a digital signal output by the shift circuit 200;

FIGS. 4A to 4L are timing charts for explaining the operation of the light detection apparatus 1 according to the present embodiment;

BEST MODES FOR CARRYING OUT THE INVENTION

Figure 1:
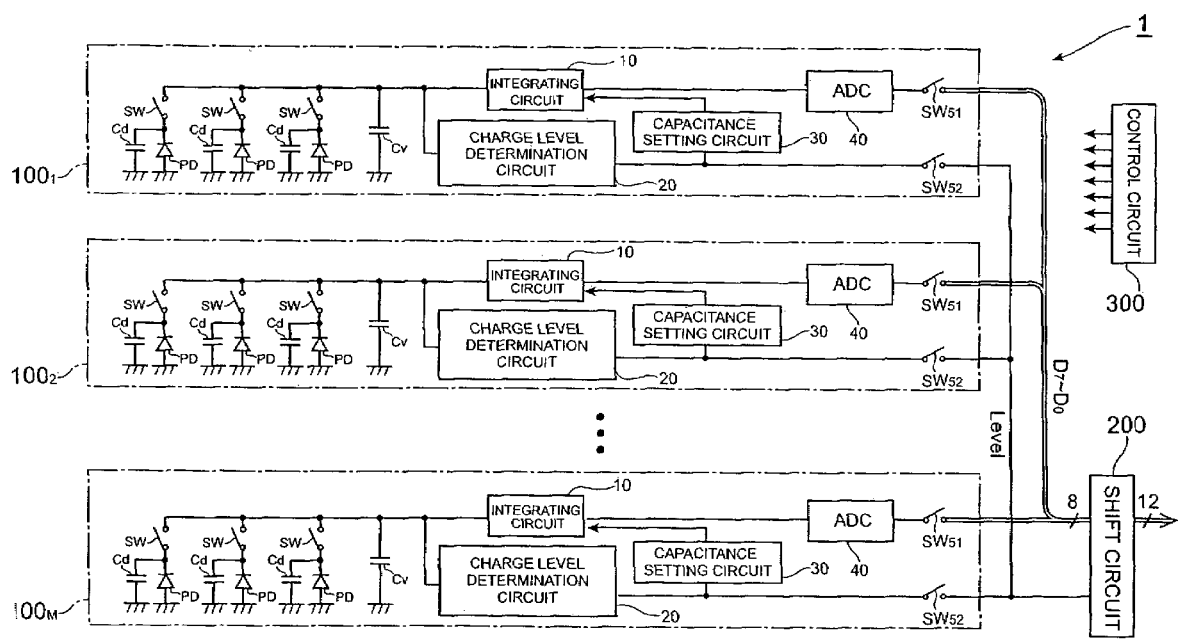
FIG. 1 is a schematic diagram showing a configuration of a light detection apparatus 1 according to the present embodiment.

The embodiments of the present invention will now be described in detail while referring to the accompanying drawings. For the explanation of the drawings, the same reference numerals are employed to denote corresponding components to avoid overlapping during the explanation.

FIG. 1 is a schematic diagram showing the configuration of a light detection apparatus 1 according to the present embodiment. This light detection apparatus 1 includes: M units (M is an integer equal to or greater than two) $100_1$ to $100_M$, a shift circuit 200 and a control circuit 300. These M units $100_1$ to $100_M$ have the same configuration to one another, and each includes a plurality of photodiodes (light detection devices) PD, switches SW, an integrating circuit 10, a charge level determination circuit 20, a capacitance setting circuit 30, an A/D converter circuit 40 and switches $SW_{51}$ and $SW_{52}$.

For the photodiodes PD of each unit $100_m$ (m is an arbitrary integer equal to or greater than one and equal to or smaller than M), the anode terminals are grounded, while the cathode terminals are connected to the input end of the integrating circuit 10, via the switches SW, and are also grounded through capacitors Cd. The capacitors Cd may be junction capacitors for the photodiodes PD, or may be provided separately from the photodiodes PD.

When the switches connected to the cathode terminals are opened, the photodiodes PD generate an amount of charges consonant with the intensity of incident light and accumulate these charges in a capacitor Cv. When the switches are closed, the photodiodes PD output the charges integrated in the capacitor Cv to the integrating circuit 10 and the charge level determination circuit 20. It should be noted that Cv in FIG. 1 is a capacitor provided to the wiring connected to the input end of the integrating circuit 10.

The integrating circuit 10 of each unit $100_m$ includes an integrating capacitor unit having a variable capacitance. The integrating circuit 10 integrates, in the integrating capacitor unit, charges generated by the photodiodes PD, and outputs to the A/D converter circuit 40 a voltage consonant with the amount of integrated charges. The charge level determination circuit 20 of each unit $100_m$ determines the amount (level) of the charges generated by each photodiode PD, and outputs a charge level signal Level, representing the determination results, to the capacitance setting circuit 30 as well as to the shift circuit 200 through the switch $SW_{52}$.

The capacitance setting circuit 30 in each unit $100_m$ receives the charge level signal Level output from the charge level determination circuit 20, and before the charge accumulation operation of the integrating circuit 10 is initiated, the capacitance setting circuit 30 sets a capacitance for the integrating capacitor unit of the integrating circuit 10 based on the charge level signal Level. The A/D converter circuit 40 of each unit $100_m$ receives a voltage output from the integrating circuit 10, performs the A/D conversion of this voltage to obtain a digital signal, and transmits the digital signal to the shift circuit 200 through the switch $SW_{51}$.

The shift circuit 200 sequentially receives, through the switch $SW_{51}$, the digital signals output from the A/D converter circuit 40 in each unit $100_m$, and in addition, sequentially receives, through the switch $SW_{52}$, the charge level signal Level from the charge level determination circuit 20 in each unit $100_m$. Then, the shift circuit 200 shifts the bits of the digital signal in accordance with the value of the charge level signal Level, and outputs the resultant digital signal.

The control circuit 300 controls the entire operation of the light detection apparatus 1, and outputs control signals for controlling the opening/closing of the switches SW connected to the photodiodes PD, the switch $SW_{51}$, the switch $SW_{52}$, and the internal switches of the integrating circuit 10 and the like. It should be noted that in FIG. 1 control signals transmitted by the control circuit 300 to the other component circuits are not shown.

Next, the individual component circuits will be described in detail.

Figure 2:
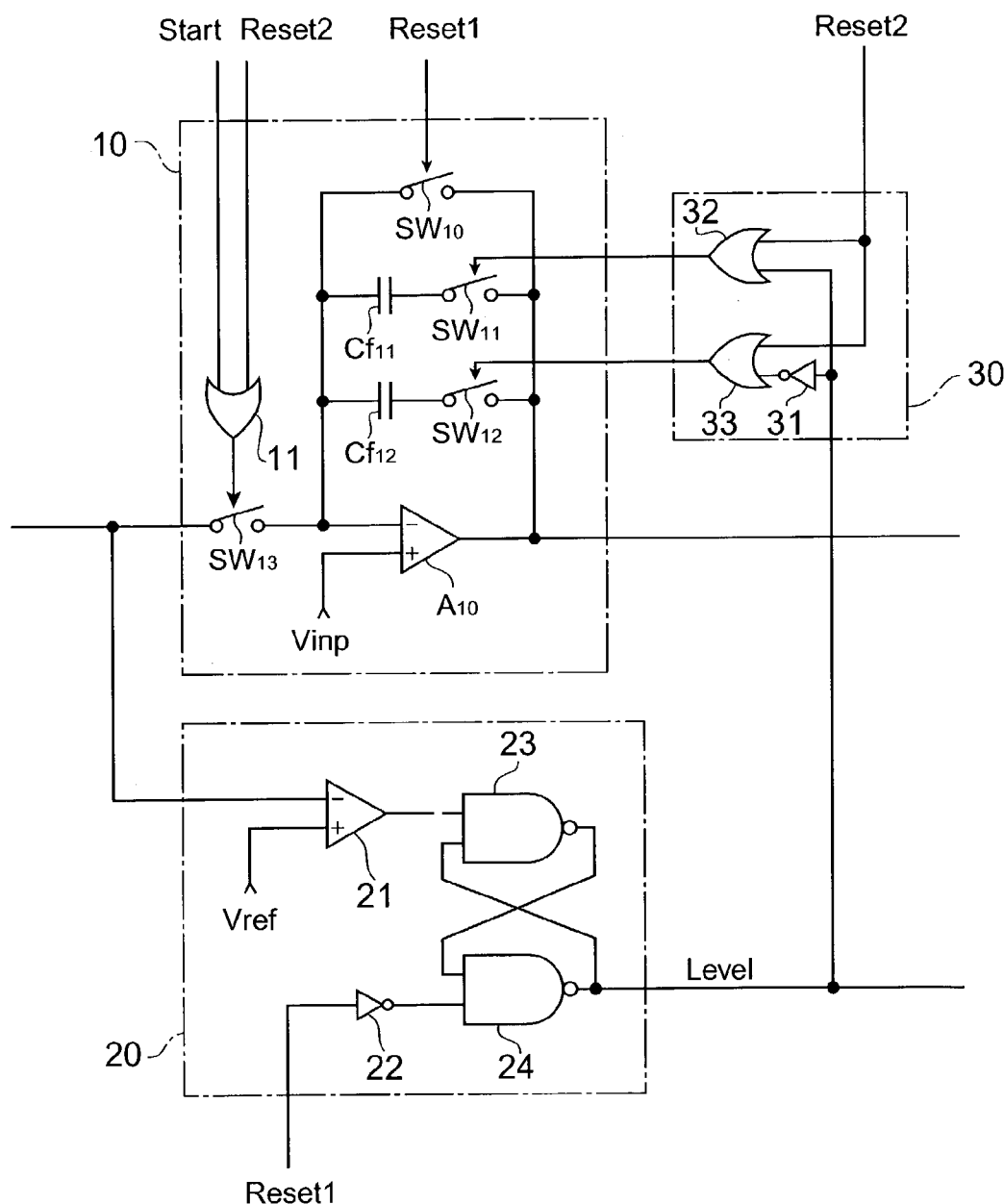
FIG. 2 is a circuit diagram showing an integrating circuit 10, a charge level determination circuit 20 and a capacitance setting circuit 30 in the light detection apparatus 1 according to the present embodiment.

FIG. 2 is a circuit diagram showing the integrating circuit 10, the charge level determination circuit 20 and the capacitance setting circuit 30 of the light detection apparatus 1 according to the present embodiment.

The integrating circuit 10 of each unit $100_m$ includes an amplifier $A_{10}$, switches $SW_{10}$ to $SW_{13}$, capacitors $Cf_{11}$ and $Cf_{12}$ and an OR circuit 11. The inverted input terminal of the amplifier $A_{10}$ is connected to the input end of the integrating circuit 10 through the switch $SW_{13}$, a constant voltage $V_{inp}$ is applied to the uninverted input terminal, and the output terminal is connected to the output end of the integrating circuit 10.

The switch $SW_{10}$ is provided between the inverted input terminal and the output terminal of the amplifier $A_{10}$. The switch $SW_{11}$ and the capacitor $Cf_{11}$ are connected in series, and are provided between the inverted input terminal and the output terminal of the amplifier $A_{10}$. Similarly, the switch $SW_{12}$ and the capacitor $Cf_{12}$ are connected in series and are provided between the inverted input terminal and the output terminal of the amplifier $A_{10}$. The capacitance of the capacitor $Cf_{11}$ is greater than the capacitance of the capacitor $Cf_{12}$.

The switch $SW_{10}$ is opened or closed based on a first reset signal Reset1 output by the control circuit 300, and the switches $SW_{11}$ and $SW_{12}$ are opened or closed based on a control signal output by the capacitance setting circuit 30. The OR circuit 11 receives a second reset signal Reset2 and an integration start signal Start from the control circuit 300 and outputs a logical sum of these two logic signals. Then, switch $SW_{13}$ performs opening/closing based on the logic signal output by the OR circuit 11.

In the integrating circuit 10, the switches $SW_{11}$ and $SW_{12}$ and the capacitors $Cf_{11}$ and $Cf_{12}$ constitute a variable capacitor unit having a variable capacitance. That is, as any of the switches $SW_{11}$ and $SW_{12}$ is closed, a value of a feedback capacitance between the inverted input terminal and the output terminal is the capacitance values any of the capacitor $Cf_{11}$ and of the capacitor $Cf_{12}$.

The charge level determination circuit 20 of each unit $100_m$ includes a comparator circuit 21, a logic inversion circuit 22 and NAND circuits 23 and 24. The inverted input terminal of the comparator circuit 21 is connected to the input end of the charge level determination circuit 20, and a reference voltage $V_{ref}$ is applied to the uninverted input terminal. The comparator circuit 21 compares the potential at the input end of the charge level determination circuit 20 with the reference voltage $V_{ref}$. Then, when the potential at the input end of the charge level determination circuit 20 is higher than the reference voltage $V_{ref}$, the comparator circuit 21 outputs a logic signal at a logic level L to the output terminal, whereas when the potential is not higher, the comparator circuit 21 outputs a logic signal at a logic level H to the output terminal. The logic inversion circuit 22 receives from the control circuit 300 the first reset signal Reset1, inverts the logic of this signal, and outputs the inverted logic signal. While to set the reference voltage $V_{ref}$ applied to the uninverted input terminal of the comparator circuit 21, the following equation is used:

$$V_{ref}=(Cf_{12}\cdot V_{sat})/(Cd+Cv) \quad (1)$$

In this equation, $V_{sat}$ defines the saturation voltage at which an amount of charges sufficient to saturate the capacitor $Cf_{12}$ is integrated, the capacitor $Cf_{12}$ having the small capacitance.

The NAND circuit 23 receives logic signals output from the comparator circuit 21 and the NAND circuit 24, inverts the logical product of these two logic signals and outputs the inverted signal. The NAND circuit 24 receives logic signals output from the logic inversion circuit 22 and the NAND circuit 23, inverts the logical product of these two logic signals and outputs the inverted signal. That is, the NAND circuits 23 and 24 latch a logic signal output from the comparator circuit 21. Thus, the charge level determination circuit 20 determines the level of the charges generated by each photodiode PD, and the NAND circuit 24 outputs the charge level signal Level as the determination results.

The capacitance setting circuit 30 in each unit $100_m$ includes a logic inversion circuit 31 and OR circuits 32 and 33.

The logic inversion circuit 31 receives the charge level signal Level output by the charge level determination circuit 20, inverts this signal and outputs the inverted signal.

The OR circuit 32 receives the second reset signal Reset2 output by the control circuit 300, and the charge level signal Level output by the charge level determination circuit 20, and outputs the logical sum of these two logic signals.

The OR circuit 33 receives the second reset signal Reset2 output by the control circuit 300 and the logic signal output by the logic inversion circuit 31, and outputs the logical sum of these two logic signals.

The switch $SW_{11}$ of the integrating circuit 10 is opened or closed based on the logic signal output by the OR circuit 32 of the capacitance setting circuit 30, and the switch $SW_{12}$ of the integrating circuit 10 is opened or closed based on the logic signal output by the OR circuit 33 of the capacitance setting circuit 30.

FIG. 3A is a circuit diagram showing the shift circuit 200 of the light detection apparatus 1 according to the embodiment, and FIGS. 3B and 3C are diagrams showing two patterns for a digital signal output by the shift circuit 200. Hereinafter, the capacitance of the capacitor $Cf_{11}$ in the integrating circuit 10 of each unit $100_m$ is defined as 16 (=$2^4$) times the capacitance of the capacitor $Cf_{12}$. The A/D converter circuit 40 in each unit $100_m$ outputs 8-bit digital signals $D_7$ to $D_0$.

The shift circuit 200 includes 12 selectors, 201 to 212. Each of these selectors 201 to 212 includes input terminals A and B, as well as a terminal for receiving the charge level signal Level output by the charge level determination circuit 20. When the charge level signal Level is at logic level H, each of the selectors 201 to 212 outputs to the output terminal the logic level input at the input terminal A. Whereas when the charge level signal Level is at logic level L, each of the selectors 201 to 212 outputs to the output terminal the logic level input at the input terminal B.

The selector 201 receives at the input terminal A logic level L, and receives at the input terminal B the least significant bit $D_0$ of an 8-bit digital signal output by the A/D converter circuit 40.

The selector 202 receives at the input terminal A the logic level L, and receives at the input terminal B bit $D_1$ of the 8-bit digital signal output by the A/D converter circuit 40.

The selector 203 receives at the input terminal A the logic level L, and receives at the input terminal B bit $D_2$ of the 8-bit digital signal output by the A/D converter circuit 40.

The selector 204 receives at the input terminal A the logic level L, and receives at the input terminal B bit $D_3$ of the 8-bit digital signal output by the A/D converter circuit 40.

The selector 205 receives at the input terminal A the least significant bit $D_0$ of the 8-bit digital signal output by the A/D converter circuit 40, and receives at the input terminal B bit $D_4$.

The selector 206 receives at the input terminal A bit $D_1$ of the 8-bit digital signal output by the A/D converter circuit 40, and receives at the input terminal B bit $D_5$.

The selector 207 receives at the input terminal A bit $D_2$ of the 8-bit digital signal output by the A/D converter circuit 40, and receives at the input terminal B bit $D_6$.

The selector 208 receives at the input terminal A bit $D_3$ of the 8-bit digital signal output by the A/D converter circuit 40, and receives at the input terminal B the most significant bit $D_7$.

The selector 209 receives at the input terminal A bit $D_4$ of the 8-bit digital signal output by the A/D converter circuit 40, and receives at the input terminal B a logic level L.

The selector 210 receives at the input terminal A bit $D_5$ of the 8-bit digital signal output by the A/D converter circuit 40, and receives at the input terminal B the logic level L.

The selector 211 receives at the input terminal A bit $D_6$ of the 8-bit digital signal output by the A/D converter circuit 40, and receives at the input terminal B the logic level L.

The selector 212 receives at the input terminal A bit $D_7$ of the 8-bit digital signal output by the A/D converter circuit 40, and receives at the input terminal B the logic level L.

That is, when the charge level signal Level output by the charge level determination circuit 20 is at the logic level H, the shift circuit 200, which has the twelve selectors 201 to 212, outputs a digital signal of 12 bits ($D_7$, $D_6$, $D_5$, $D_4$, $D_3$, $D_2$, $D_1$, $D_0$, 0, 0, 0, 0) (FIG. 3B).

Whereas, when the charge level signal Level is at the logic level L, the shift circuit 200 outputs a digital signal of 12 bits (0, 0, 0, 0, $D_7$, $D_6$, $D_5$, $D_4$, $D_3$, $D_2$, $D_1$, $D_0$) (FIG. 3C).

As is described above, the shift circuit 200 receives a digital signal of 8 bits output by the A/D converter circuit 40, and when the charge level signal Level is at the logic level H, the shift circuit 200 performs 4-bit left shift to the digital signal, the 4-bit being consonant with the ratio 16 ($=2^4$) of the capacitances of the capacitors $Cf_{11}$ and $Cf_{12}$ of the integrating circuit 10, and outputs a digital signal of 12 bits.

The operation of the light detection apparatus 1 according to this embodiment will now be described. FIGS. 4A to 4L are timing charts for explaining the operation of the light detection apparatus 1 according to this embodiment.

Before time t1, the first reset signal Reset1, the second reset signal Reset2 and the integration start signal Start, which are output by the control circuit 300, are at logic level L (FIGS. 4A to 4C). All the switches SW connected to the photodiodes PD are open (FIG. 4D).

At time t1, the first reset signal Reset1 and the second reset signal Reset2 output by the control circuit 300 go to logic level H (FIGS. 4A and 4B). Then, the logic signal output by the OR circuit 11 of the integrating circuit 10 goes to logic level H, and the logic signals output by the OR circuits 32 and 33 of the capacitance setting circuit 30 also go to the logic level H. Thereafter, the switches $SW_{10}$ to $SW_{12}$ in the integrating circuit 10 are closed, the capacitors $Cf_{11}$ and $Cf_{12}$ are discharged, and the capacitors $Cf_{11}$ and $Cf_{12}$ are initialized (FIGS. 4E to 4G). In addition, the switch $SW_{13}$ in the integrating circuit 10 is closed, and the potential of the wiring, for the connection in common of the switches connected to the photodiodes PD, becomes a constant voltage $V_{inp}$ applied to the uninverted input terminal of the amplifier $A_{10}$ in the integrating circuit 10. Furthermore, the constant voltage $V_{inp}$ is applied to the input end of the charge level determination circuit 20 (FIG. 4H).

Subsequently, at time t2, the second reset signal Reset2 goes to logic level L, and the switch $SW_{13}$ of the integrating circuit 10 is opened (FIG. 4H). At time t3, the first reset signal Reset1 goes to logic level L, and the switch $SW_{10}$ in the integrating circuit 10 is opened to enable the performance of the integral operation by the integrating circuit 10 (FIG. 4E).

At time t4, the switch SW connected to any one of the photo diodes PD is closed. Thus, the value of the input signal to the charge level determination circuit 20 is changed from the current voltage $V_{inp}$ to voltage $V_{video}$, which is represented by the following equation (FIG. 4I).

$$V_{video}=(I_{sh} \cdot T_{int})/(Cd+Cv) \quad (2)$$

In this equation, $I_{sh}$ defines the magnitude of a photocurrent flowing in the photodiode PD in accordance with the intensity of incident light, $T_{int}$ defines a period during which the switch SW connected to the photodiode PD is opened, and a product $I_{sh} \cdot T_{int}$ defines the amount of charges integrated in the capacitor Cd during the period $T_{int}$. In the charge level determination circuit 20, the comparator circuit 21 compares the above input signal voltage $V_{video}$ with the reference voltage $V_{ref}$ and determines the level of the charges generated by the photodiode PD. Then, the NAND circuits 23 and 24 latch the comparison results, and the NAND circuit 24 outputs the charge level signal Level that represents the determination results of the level of the charges generated by the photodiode PD (FIG. 4J).

If the intensity of incident light is high and the input signal voltage $V_{video}$ of the charge level determination circuit 20 is lower than the reference voltage $V_{ref}$, the logic signal output by the comparator circuit 21 goes to the logic level H, and the charge level signal Level goes to the logic level H. The logic signal output by the OR circuit 32 of the capacitance setting circuit 30 also goes to the logic level H, and the switch $SW_{11}$ of the integrating circuit 10 is closed.

The logic signal output by the OR circuit 33 of the capacitance setting circuit 30 goes to logic level L, and the switch $SW_{12}$ of the integrating circuit 10 is opened. Thus, the capacitance of the integrating capacitor unit in the integrating circuit 10 is the comparatively large capacitance of the capacitor $Cf_{11}$. Then, at time t5, the integration start signal Start, output by the control circuit 300, once goes to logic level H and then falls to logic level L.

Therefore, the switch $SW_{13}$ in the integrating circuit 10 is once closed and is then opened. When the switch $SW_{13}$ is closed, the capacitor $Cf_{11}$ integrates the amount ($I_{sh} \cdot T_{int}$) of charges generated, in consonance with the intensity of the incident light, by the photodiode PD, and the voltage $V_c$ output by the integrating circuit 10 is represented by the following equation (FIG. 4K).

$$V_c=(I_{sh} \cdot T_{int})/Cf_{11} \quad (3)$$

Then, the voltage $V_c$ converted into a digital signal ($D_7$ to $D_0$) by the A/D converter circuit 40.

When, however, the intensity of the incident light is low and the input signal voltage $V_{video}$ to the charge level determination circuit 20 is higher than the reference voltage $V_{ref}$, the logic signal output by the comparator circuit 21 goes to logic level L, and the charge level signal Level goes to the logic level L. At this time the logic signal output by the OR circuit 32 of the capacitance setting circuit 30 also goes to logic level L, and the switch $SW_{11}$ of the integrating circuit 10 is opened. Furthermore, the logic signal output by the OR circuit 33 of the capacitance setting circuit 30 goes to logic level H, and the switch $SW_{12}$ of the integrating circuit 10 is closed. Therefore, the integrating capacitor unit of the integrating circuit 10 has the comparatively small capacitance of $Cf_{12}$. At time t5, the integration start signal Start, output by the control circuit 300, once goes to logic level H, and then to logic level L. Thus, the switch $SW_{13}$ in the integrating circuit 10 is once closed and then opened. When the switch $SW_{13}$ is closed, the capacitor $Cf_{12}$ integrates the amount ($I_{sh} \cdot T_{int}$) of charges generated by the photodiode PD, in consonance with the intensity of the incident light, and the voltage $V_c$ output by the integrating circuit 10 is represented by the following equation.

$$V_c=(I_{sh} \cdot T_{int})/Cf_{12} \quad (4)$$

Then, the voltage $V_c$ is converted into digital signal ($D_7$ to $D_0$) by the A/D converter circuit 40.

The above described operation is performed in parallel by the units $100_1$ to $100_M$. Thereafter, under the control of the control circuit 300, the switches $SW_{51}$ and $SW_{52}$ in each unit $100_m$ are sequentially closed, and the digital signals ($D_7$ to $D_0$) output by the A/D converter circuit 40 and the charge level signal Level output by the charge level determination circuit 20 are input to the shift circuit 200. When the charge level signal Level is at logic level H, the 8-bit digital signal input to the shift circuit 200 is subject to 4-bit left shift, and a digital signal of 12 bits ($D_7$, $D_6$, $D_5$, $D_4$, $D_3$, $D_2$, $D_1$, $D_0$, 0, 0, 0, 0) is output (FIG. 4L). Whereas when the charge level signal Level is at logical level L, 4 digits of 0 are added preceding the upper bit of the 8-bit digital signal input to the shift circuit 200, and a digital signal of 12 bits (0, 0, 0, 0, $D_7$, $D_6$, $D_5$, $D_4$, $D_3$, $D_2$, $D_1$, $D_0$) is output by the shift circuit 20.

Figure 5:
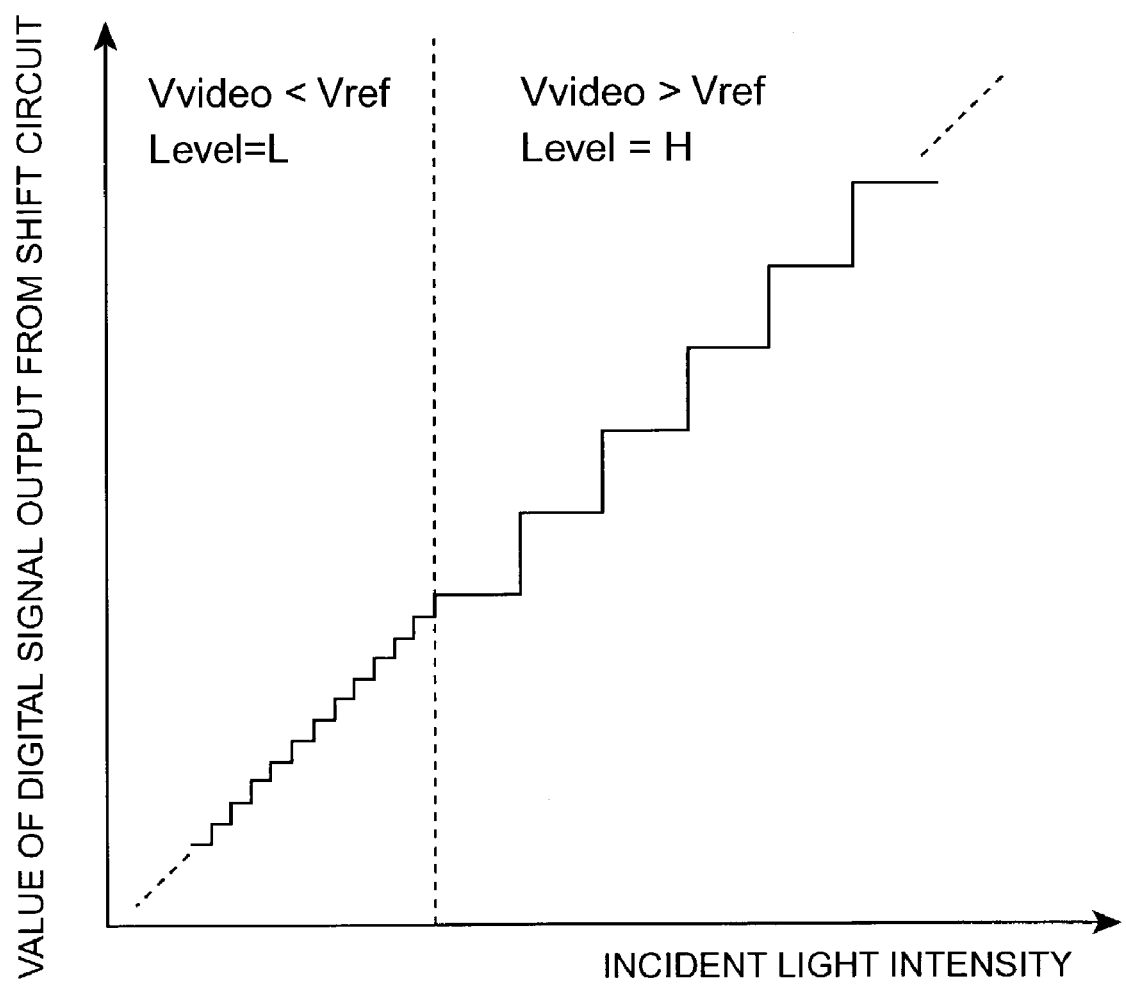
FIG. 5 is a graph showing the relationship between the value of a 12-bit digital signal, output by the shift circuit 200 of the light detection apparatus 1 according to the embodiment, and the intensity of incident light.

FIG. 5 is a graph showing a relationship between the value of a 12-bit digital signal, output by the shift circuit 200 of the light detection apparatus 1 according to this embodiment, and the intensity of the incident light. When the input signal voltage $V_{video}$ of the charge level determination circuit 20 is higher than the reference voltage $V_{ref}$, i.e., when the charge level signal Level is at logic level H, the capacitance of the variable capacitor unit of the integrating circuit 10 is the comparatively large capacitance $Cf_{11}$, and the intensity of the incident light, even when it is high, can be detected without saturation. Whereas, when the input signal voltage $V_{video}$ of the charge level determination circuit 20 is lower than the reference voltage $V_{ref}$, i.e., when the charge level signal Level is at logic level L, the capacitance of the variable capacitor unit of the integrating circuit 10 is the comparatively small capacitance of the capacitor $Cf_{12}$, and the intensity of the incident light, even when it is low, can be sensitively detected.

As is described above, since the light detection apparatus 1 according to this embodiment can appropriately and quickly set the capacitance of the variable capacitor unit of the integrating circuit 10 for each photodiode PD, a large dynamic range is obtained for the detection of the intensity of the incident light for each pixel, and the intensity of the incident light can be detected at high speed.

For the light detection apparatus 1 according to this embodiment, it is assumed that the capacitance of the capacitor $Cf_{11}$ in the integrating circuit 10 is 16 (=$2^4$) times the capacitance of the capacitor $Cf_{12}$, the A/D converter circuit 40 outputs a digital signal of 8 bits, and the shift circuit 200 performs 4-bit left shift to the digital signal, as needed. Generally, it is preferable that the capacitance of the capacitor $Cf_{11}$ of the integrating circuit 10 be $2^n$ times (n is an integer equal to or greater than one) the capacitance of the capacitor $Cf_{12}$, that the A/D converter circuit 40 output a digital signal equal to or greater than n bits, and that the shift circuit 200 perform n-bit left shift to the digital signal as needed.

Thus, the value of the digital signal output by the shift circuit 200 represents an excellent linearity relative to the intensity of the incident light.

This embodiment can be variously modified. For example, different mode of structures can be employed for the individual component circuits. The specific circuit structure for the variable capacitor unit of the integrating circuit 10 is especially not limited to the one for the above embodiment, and a different circuit structure can also be employed. The capacitance available for the variable capacitor unit of the integrating circuit 10 is not limited to two levels, as in this embodiment, and three or more levels may be used. Further, the charge level determination circuit 20 and the capacitance setting circuit 30 can be appropriately configured in accordance with the number of the levels.

The shift circuit 200 is not always necessary. A data processing apparatus, such as a computer, may receive a digital signal output from the A/D converter circuit 40 and a charge level signal Level output from the charge level determination circuit 20, and may thereafter perform a required process.

The A/D converter circuit 40 is also not always necessary provided. The data processing apparatus may perform an A/D conversion for an input voltage output from the integrating circuit 10, may also receive a charge level signal Level output from the charge level determination circuit 20 and may perform thereafter a necessary process.

According to the light detection apparatus 1 of this embodiment, included in each of M (M is an integer equal to or greater than two) units, $100_1$ to $100_M$, is a plurality of two-dimensionally arranged photodiodes PD that enables the imaging of two-dimensional images. However, M=1 may be employed instead, and a plurality of photodiodes PD may be arranged one-dimensionally for the imaging of one-dimensional images. Further, M=1 and a single photodiode PD may be included, and instead of imaging an object, the intensity of incident light may simply be detected. Also in this case, a large dynamic range may be obtained for the detection of the intensity of incident light, which can then be detected quickly, even when the intensity of incident light is greatly or rapidly changed.

As is described above, the light detection apparatus includes: the determination circuit 20 for receiving an analog signal (voltage) from the integrating circuit 10 in accordance with the output of the light detection device PD; and A/D conversion means 10 and 40 for converting, into a digital signal, the analog signal that is input at a resolution consonant with the output of the determination circuit 20. The analog signal can be input to the determination circuit 20 in accordance with the output of the light detection device PD, and based on this signal, the A/D conversion can be performed by the internal control of the A/D conversion means 10 and 40. Thus, unlike in the conventional case, the resolution of the A/D conversion means is not controlled based on the luminance of a digitized video signal, so that a rapid control process can be performed.

In this embodiment, the A/D conversion means includes: the integrating circuit 10, in which the group of the capacitors $Cf_{11}$ and $Cf_{12}$, connected to the rear stage of the light detection device PD, are connected in parallel between the input/output terminals of the operational amplifier $A_{10}$; and the capacitance setting circuit for setting, in accordance with the output of the determination circuit 20, the combined capacitance of the group of the capacitors $Cf_{11}$ and $Cf_{12}$, located between the input/output terminals of the operational amplifier $A_{10}$, before starting the operation of charge accumulation in the capacitor group $Cf_{11}$ and $Cf_{12}$, wherein the dynamic range can be changed quickly, as is described above.

Generally, the voltage=the amount of charges/the capacitance is established. Therefore, when the combined capacitance is increased as the intensity of the incident light is heightened, the change in the output voltage of the integrating circuit is reduced, relative to the change in the amount of charges, and the resolution for conversion is diminished, while the intensity of the incident light, even when it is high, can be detected without saturation of the output voltage. On the other hand, when the combined capacitance is reduced as the intensity of incident light is lessened, the change in the output voltage of the integrating circuit is increased, relative to the change in the amount of charges, and the resolution for conversion is enhanced.

Figure 6:
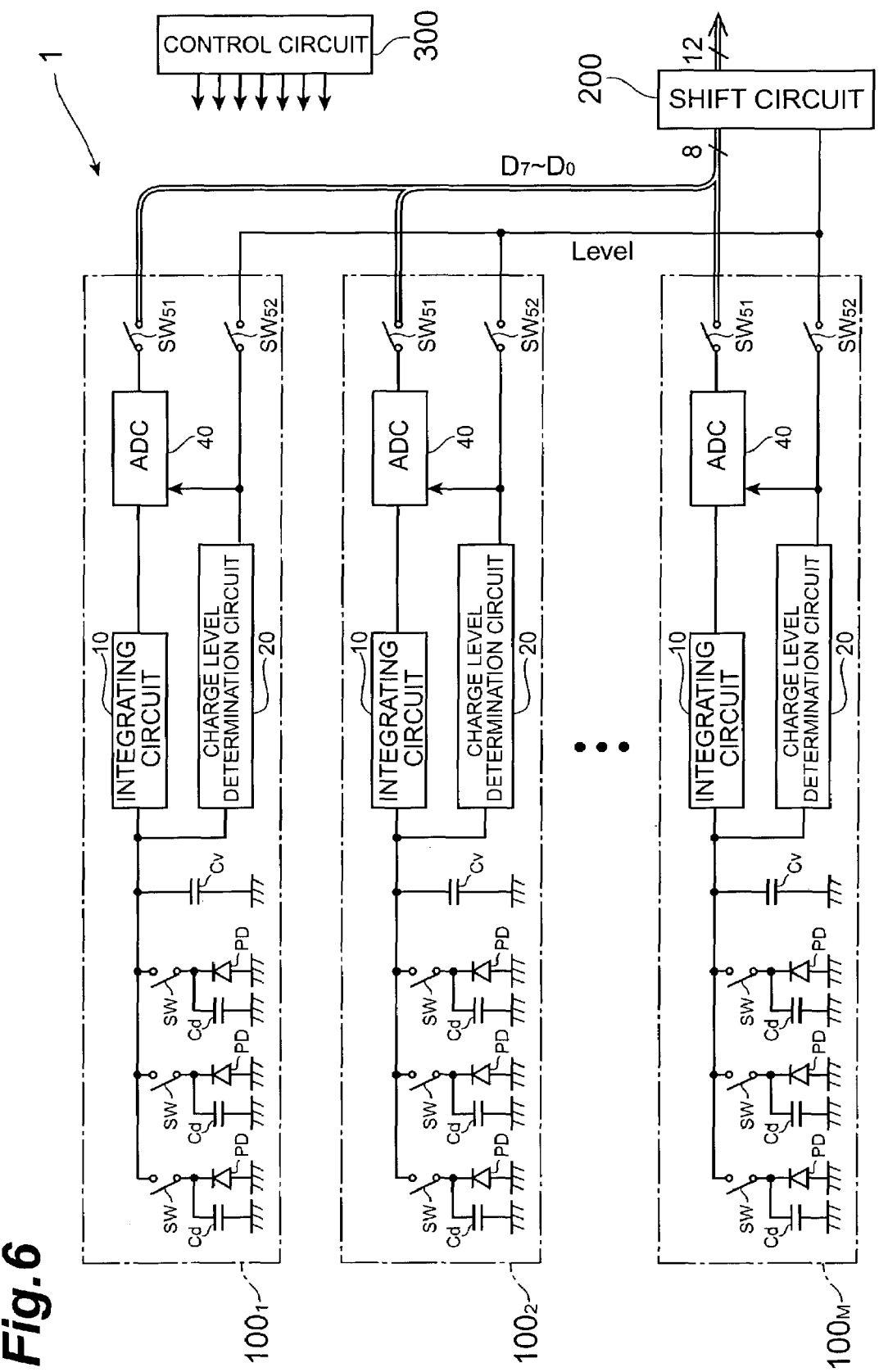
FIG. 6 is a schematic diagram showing the configuration of a light detection apparatus 1 according to another embodiment.

FIG. 6 is a schematic diagram showing the configuration of a light detection apparatus 1 according to another embodiment. The light detection apparatus 1 of this embodiment differs, in the following two points, from the light detection apparatus of the previous embodiment. The first difference is that in this embodiment the capacitance of an integrating circuit 10 is not variable. The second difference is that, while the capacitance of the integrating circuit 10 is fixed, the A/D conversion resolution and the dynamic range of an A/D converter circuit 40 are complementarily variable, and are set in accordance with the output of a charge level determination circuit 20. Detailed description will be made below.

For the light detection apparatus of this embodiment, as well as for that of the previous embodiment, the integrating circuit 10 inputs an analog signal (voltage) to the A/D converter circuit 40, in accordance with the output of a light detection device PD, and the determination circuit 20 determines the magnitude of an analog output that is consonant with the output of the light detection device. A/D conversion means 10 and 40 convert into a digital signal an analog signal inputted at a resolution consonant with the output of the determination circuit 20.

The resolution of an A/D conversion has a characteristic opposite to that of the dynamic range of an A/D conversion. That is, to convert into a digital signal an analog signal having a predetermined range magnitude, the resolution is high when a small predetermined range can be set. However, when a capacitor is employed for A/D conversion, the ratio of the change in the voltage to the change in the amount of charges is proportional to the reciprocal of the capacitance. Therefore, in other words, when a capacitor that can accumulate a small amount of charges is employed, the resolution can be increased. On the other hand, since only a small amount of charges can be integrated, the dynamic range is narrowed. In order to increase the amount of charges to be integrated, either only the voltage applied at both ends of the capacitor must be increased or only the capacitance itself must be increased.

When the intensity of the light entering the light detection device PD is high, detection thereof is made by the determination circuit 20 for receiving an analog signal consonant with the output of the light detection device, and the A/D conversion is performed at a resolution consonant with the output of the determination circuit 20. As a result, on the high intensity side, the dynamic range is ensured even when the resolution is reduced.

Further, when the intensity of the light entering the light detection device PD is reduced, detection thereof is made by the determination circuit 20, and an A/D conversion is performed at a resolution consonant with the output of the determination circuit 20. As a result, the resolution can be increased while the dynamic range on the high intensity side is narrowed. Of course, in this case, since essentially the intensity of the incident light is reduced, the A/D conversion may not be performed on the high intensity side.

As in the previous embodiment, an analog signal is transmitted to the determination circuit 20 in accordance with the output of the light detection device PD, and the A/D conversion is performed based on the output of the determination circuit 20. Unlike in the conventional case, however, in this process control of the resolution of the A/D conversion means is not based on the luminance of a digitized video signal, and high-speed control can be exercised.

Figure 7:
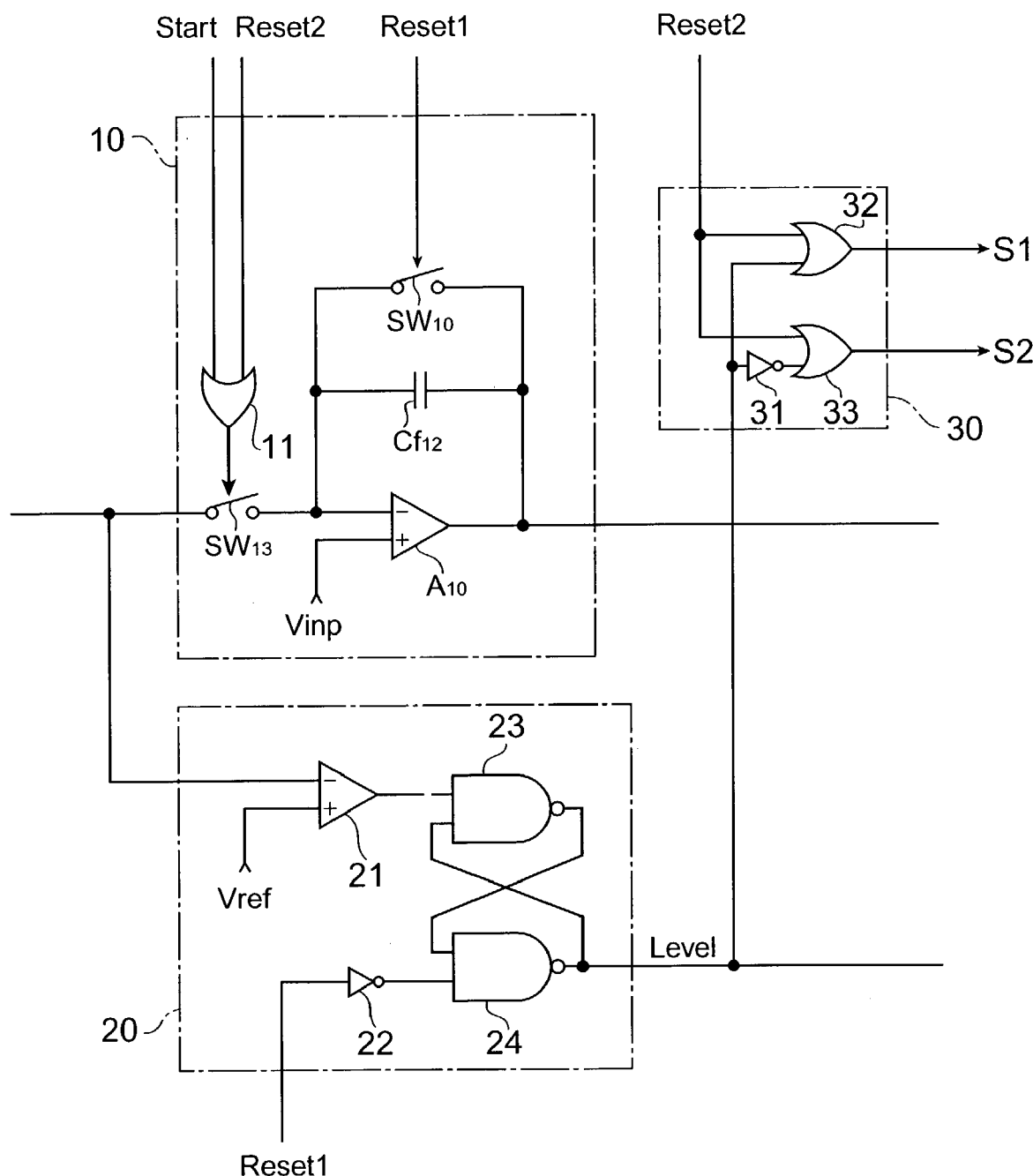
FIG. 7 is a circuit diagram showing an integrating circuit 10, a determination circuit 20 and a capacitance setting circuit 30 in the light detection apparatus 1 according to the present embodiment.

FIG. 7 is a circuit diagram showing the integrating circuit 10, the determination circuit 20 and a capacitance setting circuit 30 in the light detection apparatus 1 according to this embodiment. In this configuration, the light detection apparatus 1 according to this embodiment differs from the apparatus shown in FIG. 2 only in that the output of the determination circuit 20 is transmitted not to the integrating circuit 10, but to the A/D converter circuit 40 at the succeeding stage. Since the integrating circuit 10 does not employ the output of the determination circuit 20, unlike the one shown in FIG. 2, only one capacitor $Cf_{12}$ is provided. Of course, a plurality of capacitors may be provided.

The level of a voltage output by the capacitance setting circuit 30 is changed at a predetermined value of the intensity of the incident light detected by the light detection device PD. In this embodiment, by using this signal switching, the amount of charges to be integrated by the capacitor of the A/D converter circuit 40 at the succeeding stage is changed, and the resolution and the dynamic range of the A/D conversion are altered. As is described above, in order to increase the amount of charges to be integrated by the capacitor, either only the voltage applied at both ends of the capacitor or only the capacitance itself must be increased. First, a description will be made of the configuration employed for increasing the voltage applied at both ends of the capacitor.

Figure 8:
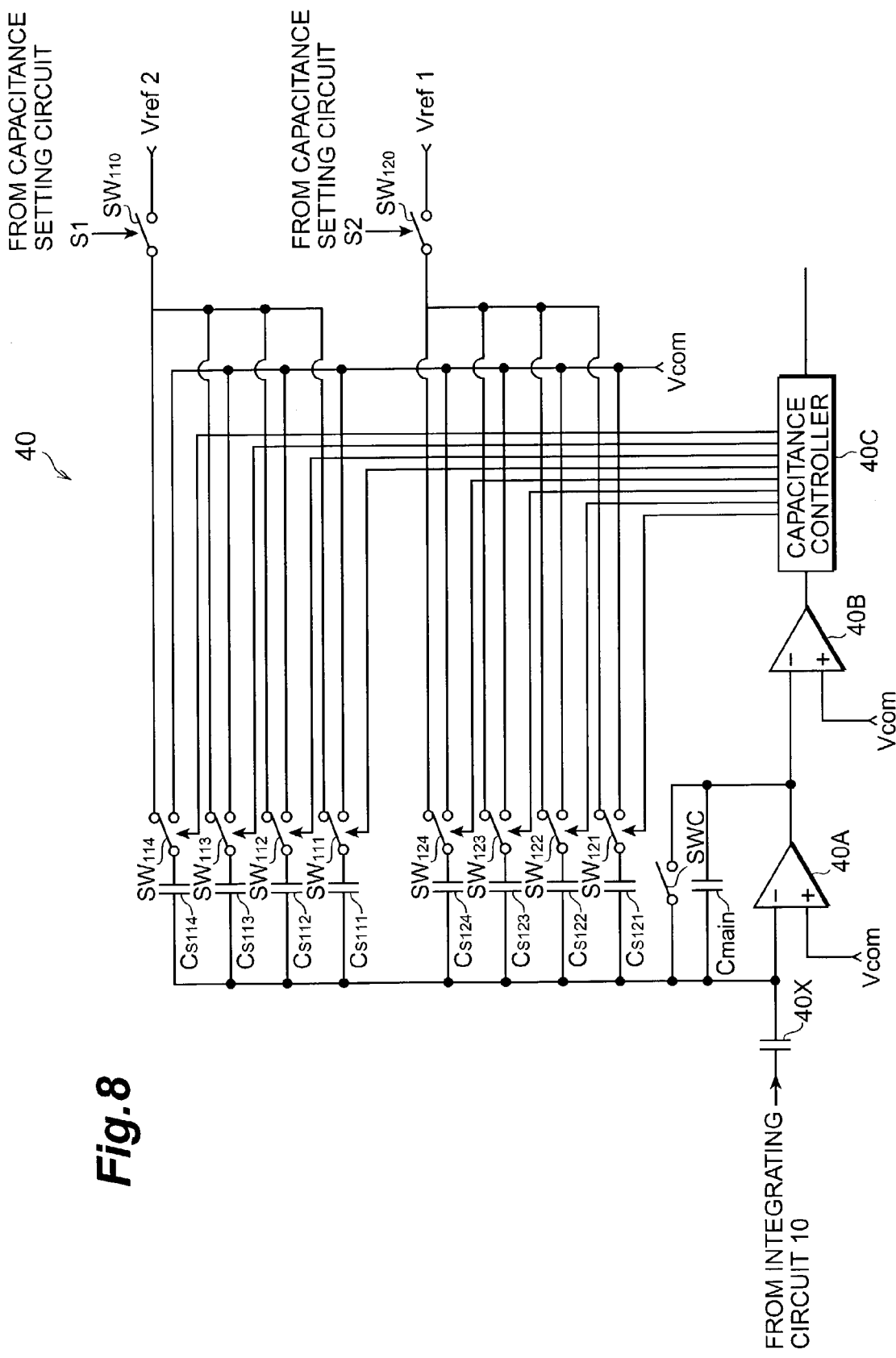
FIG. 8 is a circuit diagram showing an A/D converter circuit 40.

FIG. 8 is a circuit diagram showing the A/D converter circuit 40. An analog signal (voltage) is output by the integrating circuit 10, through a capacitor 40X, to the inverted input terminal of an operational amplifier 40A. A main capacitor Cmain is located between the input/output terminals of the operational amplifier 40A, and an amount of charges consonant with the magnitude of an analog signal is integrated. It should be noted that the charges integrated in the main capacitor are reset by closing a switch SWC for short-circuiting the main capacitor Cmain.

A voltage consonant with the charges integrated by the main capacitor Cmain is generated at the output terminal of the operational amplifier 40A and is input to a comparator 40B. When the amount of charges integrated in the main capacitor Cmain is reduced to be less than a predetermined value, the absolute value of the voltage input to the comparator 40B becomes smaller than a standard voltage Vcom, so that the output voltage of the comparator 40B goes to level L (or level H, depending on the setting). Until the output voltage of the comparator 40B reaches level L, a capacitance controller 40C controls to change switches $SW_{111}$ to $SW_{114}$, or switches $SW_{121}$ to $SW_{124}$, and transfers the charges integrated in the main capacitor Cmain to a group of sub-capacitors $C_{S111}$ to $C_{S114}$, or $C_{S121}$ to $C_{S124}$. In this embodiment, the sub-capacitor groups $C_{S111}$ to $C_{S114}$ and $C_{S121}$ to $C_{S124}$ have the same configuration, including their capacitances, and either group of sub-capacitors can serve as a substitute for the other group.

For example, when the switch $SW_{111}$ is connected to a reference voltage Vref2, a part of the charges integrated in the main capacitor Cmain is transferred to the sub-capacitor $C_{S114}$, the voltage input to the comparator 40B is reduced and one bit is set to "1". Further, in order to set the lower bits, the switch $SW_{112}$ is connected to the reference voltage Vref2, and at this time, when the voltage input to the comparator 40B falls below a predetermined value as a result of the transfer of charges from the main capacitor Cmain, the capacitance controller 40C disconnects the switch $SW_{112}$ and sets this bit to "0." When the switching is thereinafter controlled in the same manner, this control value is proportional to the magnitude of an analog signal, so that the control value itself is output as a digital signal from the capacitance controller 40C. The capacitances of each capacitor are set to be $2^n$ times one another.

During the A/D conversion operation, first, charges integrated in the main capacitor Cmain are discharged by closing the switch SWC, and thereafter, charges proportional to the analog signal (voltage) from the integrating circuit 10 are integrated by the main capacitor Cmain. The determination circuit 20 inputs to the switches $SW_{110}$ and $SW_{120}$ an instruction indicating whether the reference voltage Vref1 or the reference voltage Vref2 should be employed. Instruction signals S1 and S2, output by the determination circuit 20 and the capacitance setting circuit 30 for designating the reference voltage that should be used, depend on the intensity of the light entering the light detection device PD. Here, it is assumed that S1 is at level H when the intensity of the incident light is high, that S2 is at level H when the intensity of the incident light is low, and that accordingly, either switch $SW_{110}$ or $SW_{120}$ is connected.

In short, when the intensity of incident light is high, the sub-capacitor group $C_{S111}$ to $C_{S114}$ can be connected to the reference voltage Vref2, and when the intensity of incident light is low, the sub-capacitor group $C_{S121}$ to $C_{S124}$ can be connected to the reference voltage Vref1. When the reference voltage is higher, more charges can be integrated in the connected capacitors, thus the reference voltage Vref2, used when the intensity of incident light is high, is higher than the reference voltage Vref1. It should be noted that no charges are integrated when both ends of a capacitor are connected to the same voltage Vcom.

In this embodiment, the A/D conversion means includes: (1) the integrating circuit 10 to be connected to the succeeding stage of the light detection devices PD; and (2) the A/D converter circuit that includes the main capacitor Cmain, where charges proportional to the output of the integrating circuit 10 are integrated, multiple sub-capacitors $C_{S111}$, $C_{S112}$, $C_{S113}$ and $C_{S114}$ ($C_{S121}$, $C_{S122}$, $C_{S123}$ and $C_{S124}$), where charges are transferred from the main capacitor Cmain and are integrated, and the capacitance controller 40C, for controlling the transfer of charges to the multiple sub-capacitors $C_{S111}$, $C_{S112}$, $C_{S113}$ and $C_{S114}$ ($C_{S121}$, $C_{S122}$, $C_{S123}$ and $C_{S124}$), and for outputting the control value as a digital signal.

In accordance with the output of the determination circuit 20, the amount of accumulable charges is set for the sub-capacitors $C_{S111}$, $C_{S112}$, $C_{S113}$ and $C_{S114}$ ($C_{S121}$, $C_{S122}$, $C_{S123}$ and $C_{S124}$) (in this embodiment, the reference voltage is set). In other words, since the amount of charges=the capacitance×the voltage, when the voltage at both ends of each of the sub-capacitors $C_{S111}$, $C_{S112}$, $C_{S113}$ and $C_{S114}$ ($C_{S121}$, $C_{S122}$, $C_{S123}$ and $C_{S124}$) is controlled, the amount of accumulable charges is changed, and the resolution and the dynamic range are changed. In this case, unlike in the preceding embodiment, the A/D converter circuit adjusts the resolution based on the output of the determination circuit 20.

In this embodiment, the voltage applied at both ends of each of the sub-capacitors $C_{S111}$, $C_{S112}$, $C_{S113}$ and $C_{S114}$ ($C_{S121}$, $C_{S122}$, $C_{S123}$ and $C_{S124}$) is determined depending on the output of the determination circuit 20, and the amount of accumulable charges is set for each of the sub-capacitors $C_{S111}$, $C_{S112}$, $C_{S113}$ and $C_{S114}$ ($C_{S121}$, $C_{S122}$, $C_{S123}$ and $C_{S124}$).

That is, when the switch $SW_{110}$ is closed by the output S1 from the determination circuit 20, the group of sub-capacitors $C_{S111}$, $C_{S112}$, $C_{S113}$ and $C_{S114}$ can be connected to the reference voltage Vref2 by the control of the capacitance controller 30. In other words, the amount of charges accumulable for each capacitor is determined in accordance with the reference voltage Vref2.

Similarly, when the switch $SW_{120}$ is closed by the S2 output from the determination circuit 20, the group of sub-capacitors $C_{S121}$, $C_{S122}$, $C_{S123}$ and $C_{S124}$ can be connected to the reference voltage Vref1 by the control of the capacitance controller 30. In short, the amount of accumulable charges is determined by selecting the reference voltage Vref1.

Then, whether charges are to be integrated in these capacitors, i.e., whether charges should be transferred from the main capacitor Cmain, need only be determined by the capacitance controller 40C in the above described manner, so that the A/D conversion can be performed.

Figure 10A:
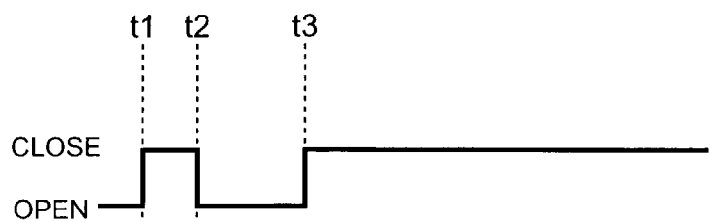
FIG. 10A is a timing chart showing the opening/closing of a switch SW110.
Figure 10B:
FIG. 10B is a timing chart showing the opening/closing of a switch SW120.

FIGS. 10A and 10B are timing charts showing the opening and closing of the switches $SW_{110}$ and $SW_{120}$. For example, when the intensity of the incident light is high, from time t1 to t2 the switches $SW_{110}$ and $SW_{120}$ are closed and then opened, and following time t3 the switch S110 is closed, so that the reference voltage Vref2 can be employed. When the reference voltage Vref can be employed, charges can be integrated in the group of the sub-capacitors $C_{S111}$, $C_{S112}$, $C_{S113}$ and $C_{S114}$ in accordance with a difference from the reference voltage Vref, and the A/D conversion can be performed with a wide dynamic range.

On the other hand, when the intensity of the incident light is low, charges can be integrated in the group of the sub-capacitors $C_{S121}$, $C_{S122}$, $C_{S123}$ and $C_{S124}$ by enabling the use of the reference voltage Vref1, and the A/D conversion can be performed at a high resolution.

In the above, the amount of accumulable charges has been controlled by controlling the reference voltage. However, a plurality of capacitors may be employed and the amount of charges may be controlled by changing the capacitances of these capacitors.

Figure 9:
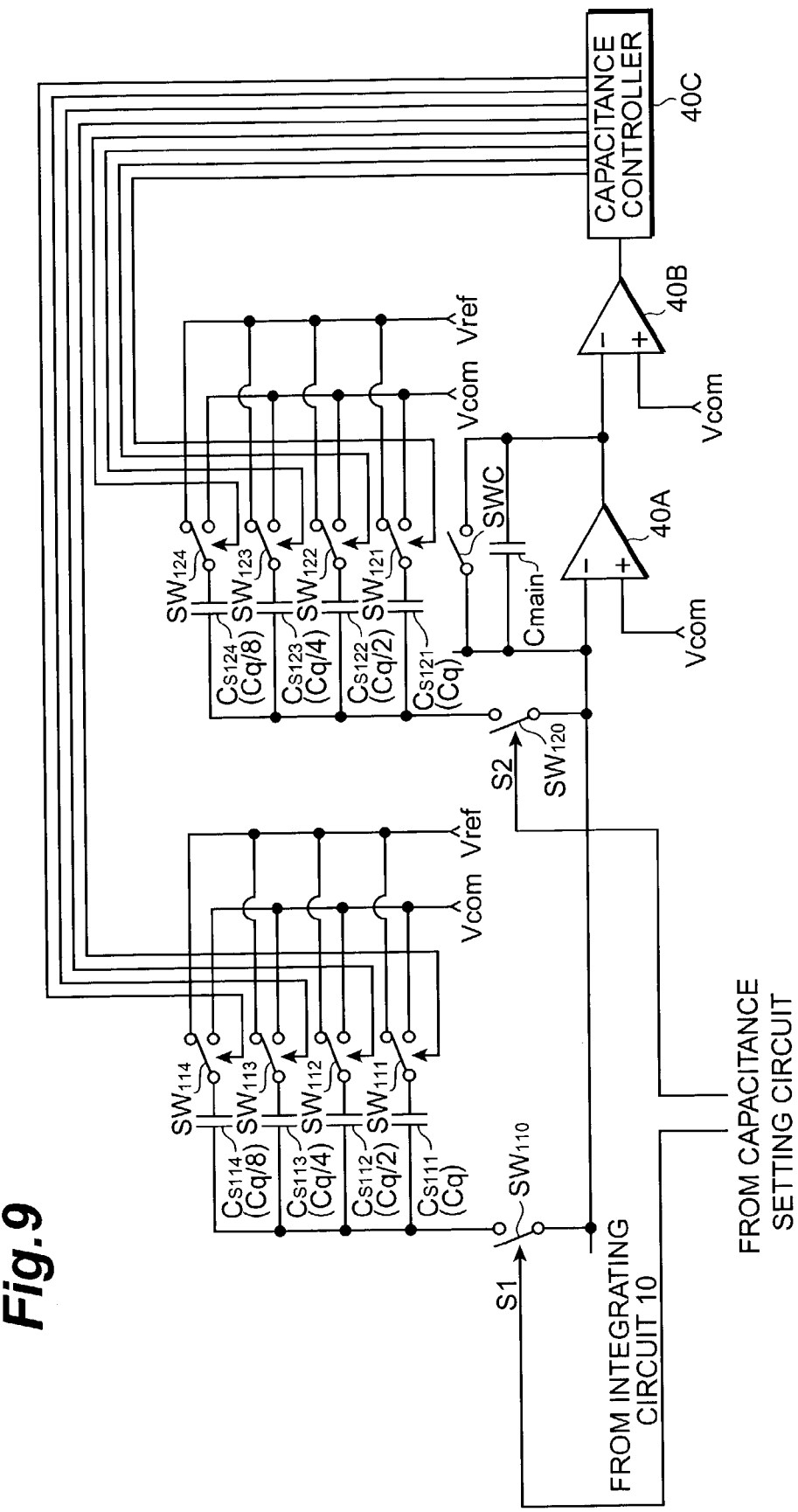
FIG. 9 is a circuit diagram showing another A/D converter circuit 40.

FIG. 9 is a circuit diagram showing another A/D converter circuit 40.

In this case, the A/D conversion means includes: (1) the integrating circuit 10 to be connected to the succeeding stage of the light detection devices PD; and (2) the A/D converter circuit, which includes the main capacitor Cmain, whereby charges proportional to the output of the integrating circuit 10 are integrated, a plurality of sub-capacitors $C_{S111}$, $C_{S112}$, $C_{S113}$ and $C_{S114}$ ($C_{S121}$, $C_{S122}$, $C_{S123}$ and $C_{S124}$), where charges are transferred from the main capacitor Cmain and are integrated, and the capacitance controller 40C for controlling the transfer of charges to the multiple sub-capacitors and for outputting the control value as a digital signal, wherein, from among the multiple sub-capacitors, a capacitor group (e.g., $C_{S111}$, $C_{S112}$, $C_{S113}$ and $C_{S114}$) of a specific capacitance group is selected, in accordance with the output of the determination circuit 20, and charges are transferred from the main capacitor Cmain to the selected capacitor group by the control of the capacitance controller 40C.

The circuit in FIG. 9 differs from the circuit in FIG. 8 in only two points: the reference voltages Vref1 and Vref2 are replaced by a single reference voltage Vref, and the capacitances of the sub-capacitors differ. When the capacitances of the capacitors $C_{S111}$, $C_{S112}$, $C_{S113}$ and $C_{S114}$ in FIG. 8 are defined as Cp, (Cp/2), (Cp/4) and (Cp/8), the capacitances of the capacitors $C_{S121}$, $C_{S122}$, $C_{S123}$ and $C_{S124}$ are Cq, (Cq/2), (Cq/4) and (Cq/8), respectively. That is, Cp and Cq are different values, and it should be noted that Cp>Cq.

The operation of the circuit in FIG. 9 is the same as that in FIG. 8. When one of sub-capacitor groups is selected for use, the capacitances Cp and Cq, which are the base capacitances for the sub-capacitor groups, are switched in the same manner as when the reference voltages Vref1 and Vref2 are switched.

Further, as described for the circuit in FIG. 8, when the intensity of incident light is high, from time t1 to t2 the switches $SW_{110}$ and $SW_{120}$ are closed and then opened, and following t3, the switch $Sw_{110}$ is closed to permit the use of the group of the sub-capacitors $C_{S111}$, $C_{S112}$, $C_{S113}$ and $C_{S114}$, which have the base capacitance Cp. Since a large amount of charges can be integrated in the group of the sub-capacitors $C_{S111}$, $C_{S112}$, $C_{S113}$ and $C_{S114}$, the A/D conversion can be performed with a wide dynamic range.

When the intensity of incident light is low, following t3 the switch $SW_{120}$ is closed to permit the use of the group of the sub-capacitors $C_{S121}$, $C_{S122}$, $C_{S123}$ and $C_{S124}$, which have the base capacitance Cq. Since only a small amount of charges can be integrated in the sub-capacitors $C_{S111}$, $C_{S112}$, $C_{S113}$ and $C_{S114}$, the A/D conversion can be performed at a high resolution. It should be noted that the relationship between the intensity of incident light and the digital output of the shift circuit 200 is the same as that shown in FIG. 5.

INDUSTRIAL APPLICABILITY

The present invention can be used for a light detection apparatus.

The invention claimed is:

1. A light detection apparatus comprising:
   a determination circuit for receiving an analog signal consonant with charges output by a light detection device and for determining the magnitude of said analog signal;
   an integrating circuit, in which a group of capacitors connected to the rear stage of said light detection device is connected in parallel between the input/output terminals of operational amplifier; and
   a capacitance setting circuit for setting, before accumulation of charges in said group of capacitors is started, in accordance with the output of the determination circuit, a combined capacitance for the group of capacitors connected between the input/output terminals, so that a dynamic range is set for an output voltage of said integrating circuit,
   wherein A/D conversion is performed for said output voltage.

2. The light detection apparatus according to claim 1, further comprising:
   an A/D converter circuit for converting the output of said integrating circuit into a digital signal.

3. The light detection apparatus according to claim 2, further comprising:
   a shift circuit for receiving a digital signal output from said A/D converter circuit, and for shifting bits of said digital signal, in accordance with the output of said determination, circuit to output the resultant signal.

4. The light detection apparatus according to claim 2,
   wherein said combined capacitance can be set to a first capacitance or a second capacitance, and said first capacitance is $2^n$ times said second capacitance, and
   wherein said A/D converter circuit outputs a digital signal having n or greater bits.

* * * * *